Sept. 9, 1958  G. F. HAUSMANN  2,850,873
BY-PASS RAMJET
Filed Aug. 16, 1957
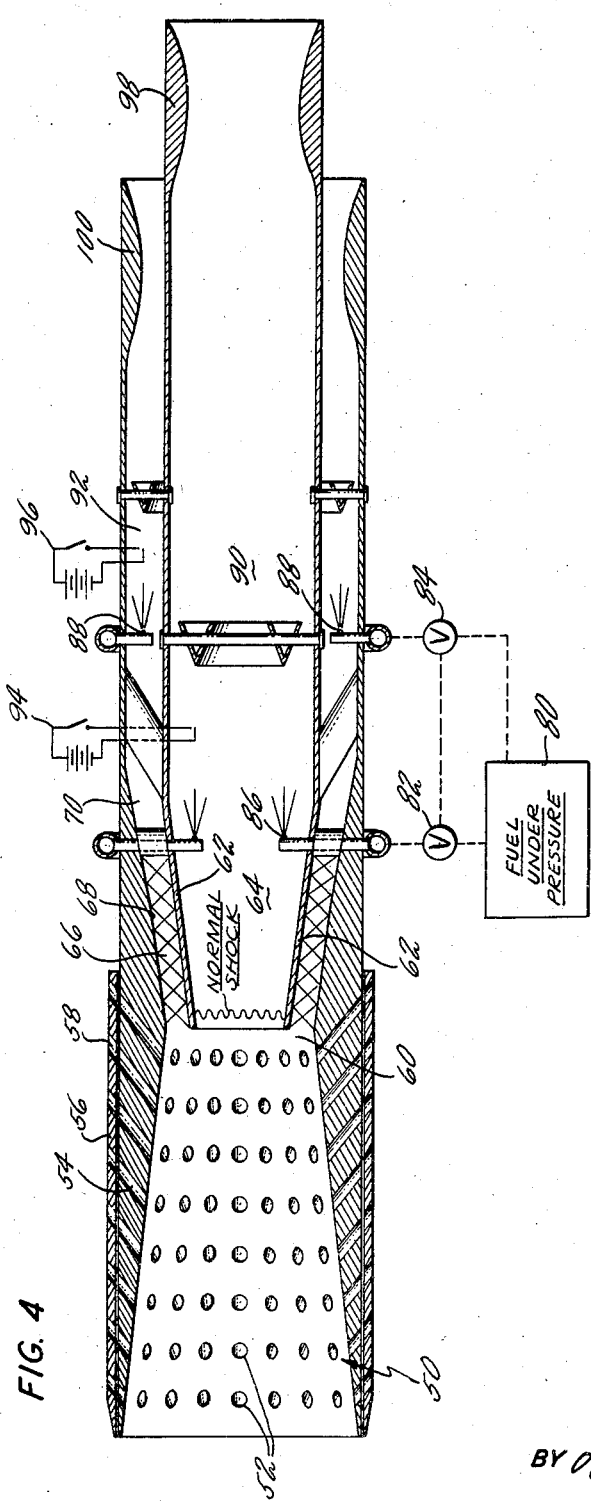
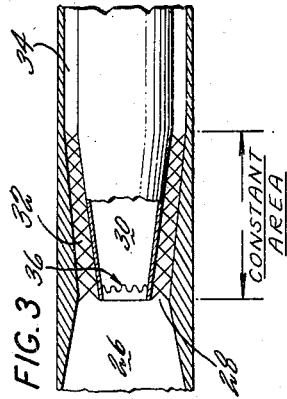
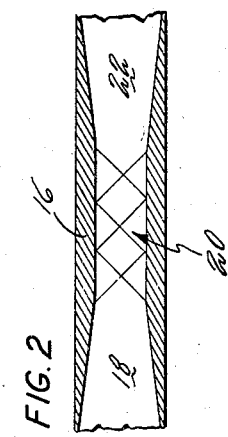
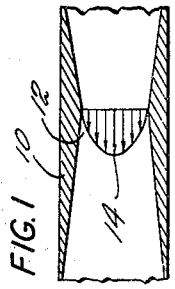
INVENTOR
GEORGE F. HAUSMANN
BY *Leonard F Walsh*
ATTORNEY

United States Patent Office 2,850,873
Patented Sept. 9, 1958

2,850,873
BY-PASS RAMJET

George F. Hausmann, Glastonbury, Conn., assignor to United Aircraft Corporation, East Hartford, Conn., a corporation of Delaware Application August 16, 1957, Serial No. 678,485

7 Claims. (Cl. 60—35.6)

This invention relates to high output power plants such as ramjets and more particularly to bypass type power plants.

It is an object of this invention to provide a ramjet power plant having maximum efficiency with minimum weight.

It is a further object of this invention to provide a power plant having a common supersonic inlet including means for separating the high and low energy portions of the air flow tube at the throat of the inlet and shocking down these portions in separate paths.

It is a still further object of this invention to divide the air flow at the throat of the precompression inlet into high and low energy portions and to shock down the central high energy core with a short normal shock and to shock down the low energy annulus with a long constant area throat.

These and other objects of this invention will become readily apparent from the following detailed description of the drawing in which:

Fig. 1 shows the energy or velocity pattern of the air flow in the throat of a convergent-divergent diffuser;

Fig. 2 is a schematic illustration of the shock pattern and constant area section adjacent the throat required for shock stabilization;

Fig. 3 is a schematic illustration of the proposed invention illustrating the main and bypassed flows and their shock patterns; and Fig. 4 is a cross sectional illustration of a practical embodiment of this invention.

As best seen in Fig. 1, ordinary convergent-divergent inlets have a certain amount of low energy boundary layer air at the throat. This boundary layer air is located adjacent the walls of the inlet.

Thus, for example, as seen in Fig. 1, the boundary layer air builds up on the inside of the wall 10 such that it has a substantially low energy in the region 12 adjacent the wall and a relatively high energy in the region 14 at a point farthest from the wall 10 near the center of the stream.

In order to obtain maximum pressure recovery it is necessary that the throat 16 of the diffuser as seen in Fig. 2 must be made of a constant area or cross section over a long axial distance in order to stabilize the shock at the throat. With a long constant area throat as seen in Fig. 2 the supersonic stream approaching in the converging portion 18 will pass through a shock pattern generally indicated at 20 where it is shocked down to a high subsonic flow and subsequently diffused subsonically in a diverging portion 22. It is thus apparent that the high and low energy streams are mixed and shocked down generally in the throat area 16. However, the length of constant area throat required to stabilize shock can be as much as five to ten times the throat diameter which factor imposes a high weight penalty. Furthermore, pressure losses are incurred which, for a ramjet propulsion system, are more severe than if the high energy and the low energy portions of the stream were separated as in Fig. 3.

It is therefore the purpose of this invention to prevent the intermixing of the high and low energy portions of the stream until they have passed through the various energy conversion portions of the cycle which take place while the stream is confined in a duct such as a power plant.

It is also a purpose to provide a minimum length (or weight) of power plant while still utilizing a constant area throat for mixing and shocking of the low energy stream at the inlet throat. Thus, as seen in Fig. 3 a supersonic convergent diffuser portion 26 is illustrated as having a throat region 28. Downstream of the throat region 28 the duct is then divided into a divergent diffuser portion 30 located centrally of the main stream and an outer annular duct 32 which surrounds the main duct 30. The annular duct 32 includes a constant area portion as shown and then diverges in a region 34 downstream thereof. In this manner the high energy central core of the main stream is immediately shocked down to a subsonic velocity through a sharply defined normal shock generally indicated at 36, while the low energy stream is shocked down over the elongated constant cross section throat area 32 which is formed as an annulus around the main duct 30. This principle is applied in the construction shown in Fig. 4.

Referring to Fig. 4. a ramjet power plant is illustrated as having a supersonic convergent inlet at 50 which includes a plurality of perforations 52 which communicate with a plurality of passages 54 located in the wall of the convergent portion of this inlet. A rotatable sleeve 56 may be provided with a plurality of cooperating ports 58 which can be moved into or out of alignment with the passages 54. This variable bleed mechanism permits starting of the power plant and proper operation at off conditions. A variable bleed inlet of this type is clearly described and claimed in application Serial No. 336,746 filed February 13, 1953, by George F. Hausmann for Variable Bleed Diffuser. The convergent inlet portion 50 has a throat region 60 which will contain high energy air near the central portion of the air flow and substantially low energy air near the wall of the diffuser. In order to properly handle the air so that mixture of the high and low energy streams is avoided at this stage in the power plant, a central diverging wall 62 forms main central diverging passage 64. Since the core or central portion of the air stream flow at the throat is at a high energy level, there is substantially little trouble in having the supersonic stream shock down through a stable normal shock in a substantially zero length throat as illustrated. However, the low energy air adjacent the wall of the convergent portion of the inlet is bypassed through an annular passage 66 which surrounds the main diverging duct portion 64. The passage or duct portion 66 is formed by an outer wall 68 which cooperates with the wall 62 to form a constant area passage which is of sufficient length to provide the shock pattern illustrated in order to shock down the low energy air downstream of the passage 66. The bypassed air is further diffused through a diverging passage 70 leading to its respective combustion chamber.

Thus, fuel may be lead from a source of pressure 80 through either of control valves 82 or 84 leading to the nozzles 86 and 88, respectively. The nozzles 86 introduce fuel into the main combustion chamber 90 of the central power plant while the nozzles 88 introduce fuel into the annular bypass combustion chamber 92. The fuel and air mixture may be ignited by any suitable means such as shown at 94 and 96, respectively. The central combustion chamber 90 includes a convergent-divergent exhaust nozzle 98 while the bypass combustion chamber leads to a convergent-divergent exhaust nozzle 100.

By the means shown and described the main center of the air stream approaching the throat 60 of the inlet and the low energy boundary layer approaching the throat are shocked down, diffused, and burned separately with a net increase in thrust over that obtained in a single type power plant which may have a diffuser for example of the type shown in Fig. 2.

As a result of this invention a relatively high over-all pressure recovery is obtainable from the diffusers while weight may be reduced by a decrease in the length required over a configuration such as illustrated in Fig. 2. Therefore, more thrust is obtainable with a much shorter power plant. Furthermore, this resulting advantage is obtained by providing a mixing of the main and bypassed streams at a point where the velocities are relatively high adjacent the exhaust nozzles or in the stream well beyond the exhaust nozzle openings.

Although only one embodiment of this invention has been illustrated and described herein, it will become apparent that various changes and modifications may be made in the construction and arrangement of the various parts without departing from the scope of this novel concept.

What it is desired by Letters Patent is:

1. In a power plant having a supersonic inlet, said inlet including a converging portion terminating in a throat, a main central duct receiving a portion of the air from said throat and being defined by a central diverging wall portion for subsonic diffusion of the core of the air stream flowing at said throat, and an annular duct surrounding said central duct and being defined by an outer wall cooperating with said central wall portion to form a constant cross-sectional area over a predetermined axial length of the power plant and receiving the remainder of the air flowing at said throat.

2. In a power plant having a supersonic inlet, said inlet including a converging portion terminating in a throat, a main central duct receiving a portion of the air from said throat and being defined by a central diverging wall portion for subsonic diffusion of the core of the air stream flowing at said throat, and annular duct surrounding said central duct and being defined by an outer wall cooperating with said central wall portion to form a constant cross sectional area over a predetermined axial length of the power plant and receiving the remainder of the air flowing at said throat, said annular duct being conical in planiform, means for introducing fuel into said central duct and said annular duct for burning therein, and a converging diverging exhaust nozzle for each of said ducts.

3. In a power plant having a supersonic inlet, said inlet including a converging portion terminating in a throat, a main central duct receiving a portion of the air from said throat and being defined by a central diverging wall portion for subsonic diffusion of the core of the air stream flowing at said throat, said central duct having an upstream lip at said throat, an annular duct surrounding said central duct and being defined by an outer wall cooperating with said central wall portion to form a constant cross-sectional area over a predetermined axial length of the power plant and receiving the remainder of the air flowing at said throat, and a duct portion downstream of said annular duct and receiving fluid therefrom, said downstream duct portion being diverging in cross-sectional area over at least a part of its axial length.

4. In a ramjet power plant having a main converging inlet portion terminating in a throat, a central passage receiving the core of the air flowing at said throat, a secondary annular passage surrounding said central passage and receiving the remaining air flowing at said throat which surrounds said core of air, means for producing a normal shock at the threshhold of said central passage and subsequently diffusing the air subsonically, means for shocking down the air in said secondary passage over an extended length along the longitudinal axis of said power plant, and means for introducing fuel into both said passages at a point downstream of said throat to be burned therein.

5. In a ramjet power plant having a main converging inlet portion terminating in a throat, a central passage receiving the core of the air flowing at said throat, a secondary annular passage surrounding said central passage and receiving the remaining air flowing at said throat, means for producing a normal shock at the threshhold of said central passage and subsequently diffusing the air subsonically, means for shocking down the air in said secondary passage over an extended length along the longitudinal axis of said power plant including a portion of said secondary passage which is substantially of constant cross-sectional area, and means for introducing fuel into both said passages at a point downstream of said throat.

6. In a bypass type ramjet power plant having a main converging inlet portion terminating in a throat, bleed means for said converging portion, a central passage receiving the core of the air flowing at said throat, said central passage having a cross section which increases in area in a downstream direction, a secondary annular passage surrounding said central passage and receiving the remaining air flowing at said throat, means for producing a normal shock at the threshhold of said central passage and subsequently diffusing the air subsonically, means for shocking down the air in said secondary passage over an extended length along the longitudinal axis of said power plant including a portion of said secondary passage which is of constant cross-sectional area, means for introducing fuel into both said passages at a point downstream of said throat, means for buring said fuel and air, and an exhaust nozzle for each of said central and secondary passages for separately discharging the gases from each passage.

7. In a ramjet according to claim 6 wherein said exhaust nozzles are spaced relative to each other along the longitudinal axis of said power plant.

No references cited.